US005629957A

United States Patent [19]
Murata

[11] Patent Number: 5,629,957
[45] Date of Patent: May 13, 1997

[54] METHOD AND APPARATUS FOR SIMULTANEOUSLY DISPLAYING DISTRIBUTION PATTERNS OF EQUALIZED OUTPUT SIGNALS FROM MULTIPLE CHANNELS

[75] Inventor: Hiroyasu Murata, Kawasaki, Japan

[73] Assignee: Fujitsu Limited, Kawasaki, Japan

[21] Appl. No.: 566,485

[22] Filed: Dec. 4, 1995

Related U.S. Application Data

[63] Continuation of Ser. No. 32,236, Mar. 17, 1993, abandoned.

[30] Foreign Application Priority Data

Mar. 17, 1992 [JP] Japan ................................. 4-059991

[51] Int. Cl.$^6$ ........................ H03H 7/30; G09G 5/00; H04N 5/445
[52] U.S. Cl. ...................... 375/232; 345/115; 345/127; 345/133; 348/564
[58] Field of Search ........................... 345/115, 116, 345/133, 134, 135, 127, 129; 348/563, 564, 565, 566, 567, 568; 375/232, 233, 235, 230, 346, 348; 370/69.1

[56] References Cited

U.S. PATENT DOCUMENTS

| | | | |
|---|---|---|---|
| 4,257,043 | 3/1981 | Tsuchiko | 345/115 |
| 4,710,762 | 12/1987 | Yamada | 345/115 |
| 4,985,900 | 1/1991 | Rhind et al. | 375/10 |
| 5,047,858 | 9/1991 | Aimonoya | 348/564 |
| 5,146,335 | 9/1992 | Kim et al. | 348/564 |

*Primary Examiner*—Stephen Chin
*Assistant Examiner*—Hai H. Phan
*Attorney, Agent, or Firm*—Staas & Halsey

[57] ABSTRACT

An eye pattern display device for receiving and equalizing signals transmitted on a frequency-division multiplex basis to produce equalized output signals and displaying eye patterns of the equalized output signals is intended to check the eye patterns of the equalized output signals on multiple channels simultaneously. Level converters convert the signal levels of the equalized output signals output from channel demodulators. Offset adders add predetermined offset signals to level-converted equalized output signals so that they can be displayed on corresponding display areas of a display which are allocated to the respective channels. A selector selects output signals of the offset adders in sequence to display the eye patterns of the equalized output signals simultaneously on the display.

19 Claims, 6 Drawing Sheets

A CHANNEL

B CHANNEL

C CHANNEL

SECONDARY CHANNEL

METHOD AND APPARATUS FOR SIMULTANEOUSLY DISPLAYING DISTRIBUTION PATTERNS OF EQUALIZED OUTPUT SIGNALS FROM MULTIPLE CHANNELS

This application is a continuation, of application Ser. No. 08/032,236, filed Mar. 17, 1993, now abandoned.

BACKGROUND OF THE INVENTION

1. Field of the Invention

The present invention relates to a method of and a device for displaying distribution patterns of frequency-division multiplexed signals which have been received and equalized.

2. Description of the Related Art

In data transmission among data processor terminals using analog lines, a sending terminal sends modulated digital data onto a transmission line, and a receiving terminal demodulates the received signal to recover the original digital data. The equipment for implementing this type of data transmission is called a modulator/demodulator (modem).

Data multiplex transmission systems include time-division multiplexing (TDM) and frequency-division multiplexing (FDM). The FDM systems include a system provided with a secondary channel used for monitoring the network by transmitting signal quality information, error rates, etc., in addition to a main channel used for transmitting main data, a system which divides the main channel into more than one channel, and so on.

In the time-division multiplexing system, a single carrier frequency is used. Thus, distribution patterns (the distribution of received signals on a two-dimensional plane) of equalized output signals on time-division channels obtained by a demodulator in a modem are essentially the same.

In contrast, there is more than one carrier frequency in the frequency-division multiplexing system. Distortion caused by a transmission line differs among frequency channels. Thus, the distribution patterns of equalized output signals obtained from the demodulator in a modem differ among channels. For this reason, in order to monitor the receive conditions of signals transmitted on a frequency-division multiplexing basis, it is necessary to examine a distribution pattern for each channel.

Heretofore, in examining a distribution pattern on each channel, receive channels are selected in sequence to display a distribution pattern for each channel.

FIG. 1 is a diagram used to explain a conventional method of displaying distribution patterns. In this example, a voice band of 0.3 to 3.4 KHz is divided, as shown in FIG. 1A, into four channels; an A channel, a B channel and a C channel for data transmission, and a secondary channel over which signal quality information is transmitted.

When monitoring the receive condition of each of the channels assigned to corresponding frequency bands, a user selects the channels in sequence in such a way as to select the A channel first to display the distribution pattern of an A-channel equalized output signal (FIG. 1B), the B channel second to display the distribution pattern of a B-channel equalized output signal (FIG. 1C), the C channel third to display the distribution pattern of a C-channel equalized output signal (FIG. 1D), and the secondary channel finally to display the distribution pattern of a secondary-channel equalized output signal (FIG. 1E).

That is, with a modem which modulates and demodulates frequency-division multiplexed signals, it is necessary to observe the distribution pattern of each of frequency-divided channels, thereby understanding the receive condition of each channel. However, with the conventional distribution pattern displaying method, since only a single distribution pattern at a time is displayed, in order to display the distribution pattern of each channel and understand the receive state of each channel, the user is required to perform switching from one channel to another. This operation is troublesome, and has the problem that the entire receive condition cannot be recognized simultaneously.

SUMMARY OF THE INVENTION

An object of the present invention to provide a method of and apparatus for displaying distribution patterns of equalized output signals on multiple channels simultaneously on a display screen.

A feature of the present invention resides in a distribution pattern display device for receiving and equalizing signals transmitted on a frequency-division multiplex basis and displaying the distribution patterns of received signals subjected to equalization, comprising equalizing means for compensating for distortion which a signal on each frequency channel undergoes on a transmission path, level conversion means for converting the signal level of an equalized output signal on each channel from said equalizing means, coordinate transformation means for transforming the coordinates of a level-converted equalized output signal on each channel output from said level conversion means so that it can be displayed on a display area of a display which is allocated to that channel and control means for permitting each of coordinate-transformed equalized output signals on the frequency channels output from said coordinate transformation means to be displayed simultaneously on a corresponding one of display areas of said display.

In a distribution pattern display device of the present invention which receives and equalizes signals transmitted on a frequency-division multiplex basis and displays distribution patterns of the equalized receive signals, equalizing means compensates for distortion of the receive signals caused by a transmission path to produce equalized output signals, and level conversion means causes the equalized output signals to have a predetermined signal level.

Further, coordinate transformation means performs coordinate transformation on level-converted equalized output signals so that they can be displayed on corresponding display areas which are allocated to the respective channels. Control means permits coordinate-transformed equalized output signals to be displayed on the corresponding respective display areas. Thereby, even in the presence of multiple channels, the distribution patterns of the corresponding equalized output signals can be displayed simultaneously on the same display, permitting the receive condition of each channel to be understood instantly.

BRIEF DESCRIPTION OF THE DRAWINGS

One skilled in the art can easily understand additional features and objects of this invention from the description of the preferred embodiments and some of the attached drawings. In the drawings.

DETAILED DESCRIPTION OF THE PREFERRED EMBODIMENTS

The preferred embodiments of the present invention are explained below by referring to the attached drawings.

Figure 1A:
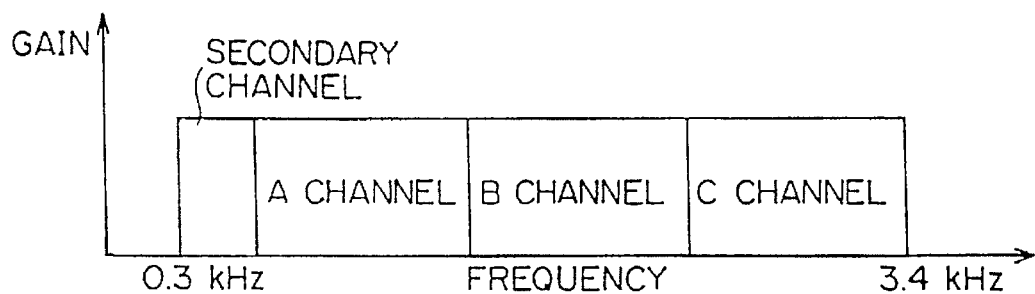
FIGS. 1A through 1E are diagrams used to explain a conventional distribution pattern displaying method.
Figure 1B:
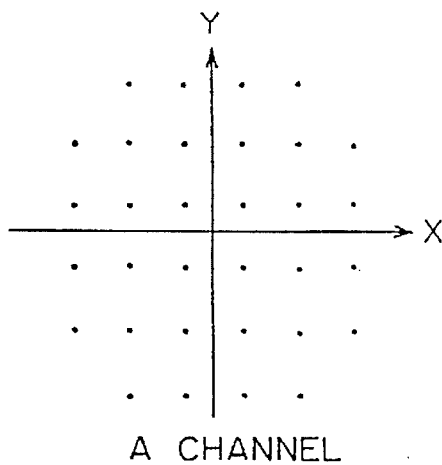
Figure 1C:
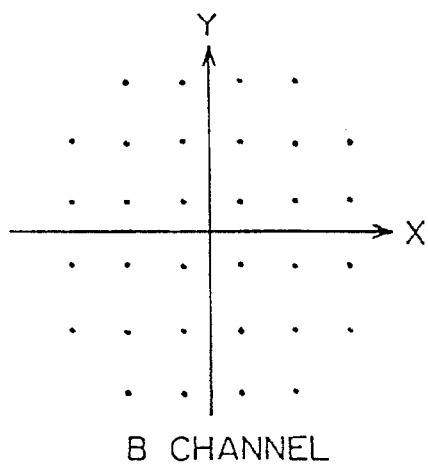
Figure 1D:
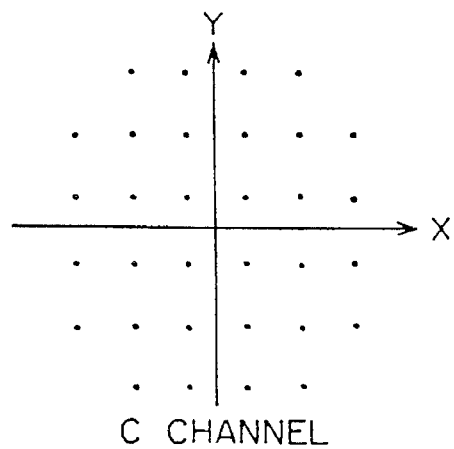
Figure 1E:
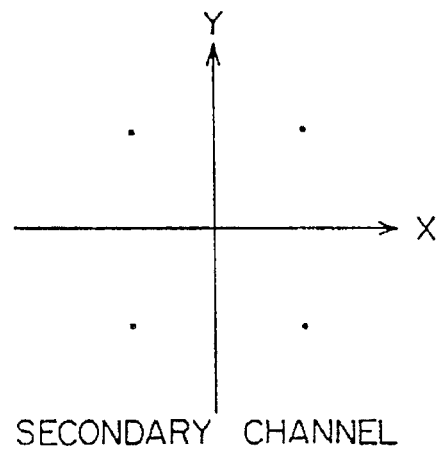
Figure 2:
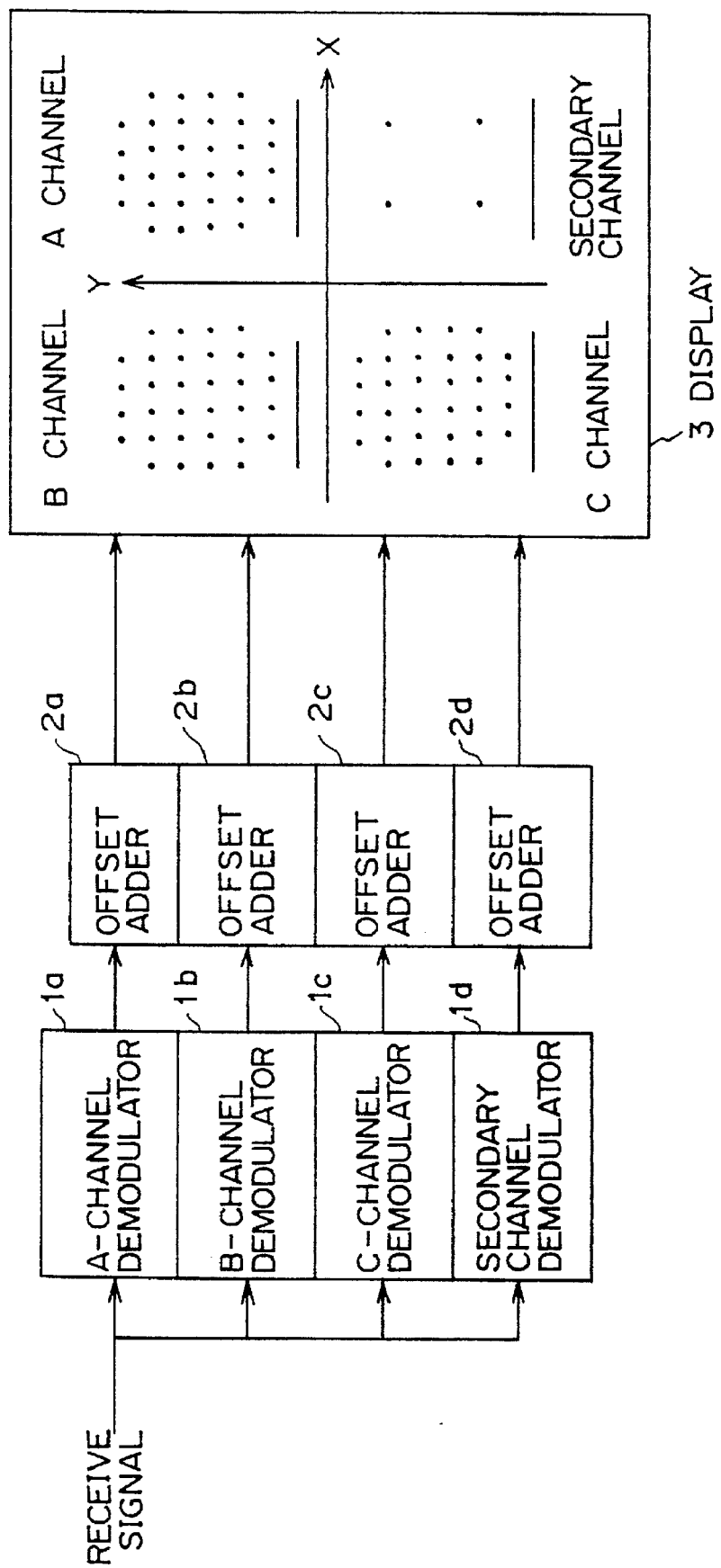
FIG. 2 illustrates a basic arrangement of the preferred embodiment of the present invention.

Referring now to FIG. 2, there is shown a basic arrangement of an FDM modem according to the present invention. More specifically, FIG. 2 shows a distribution pattern display device in an FDM transmission system in which data is transmitted over four channels; A, B and C channels, and a secondary channel, into which the band of a voice-grade analog line is divided.

The distribution pattern display device comprises four demodulators 1a to 1d, corresponding to the four channels, which demodulate channel signals from a received frequency-division multiplexed signal and then convert them to digital signals, and offset adders 2a to 2d which perform coordinate transformation for displaying the signals demodulated by the demodulators 1a to 1d on the respective display areas of a display device 3.

Each of the demodulators 1a to 1d equalizes a corresponding received signal and then outputs an equalized output signal to a respective one of the offset adders 2a to 2d. Each of the offset adders 2a to 2d performs level conversion on the equalized output signal from the corresponding demodulators 1a to 1d and then adds a predetermined offset signal to it for transmission to the display device 3. Also, each of the offset adders 2a to 2d performs level conversion on a signal quality signal indicating the quality of a signal on the corresponding channel and then adds a predetermined offset signal to it for transmission to the display device 3.

The operation of the offset adders 2a to 2d will be described more specifically. Coordinate data of an equalized output signal, centered at the origin of a two-dimensional plane (the origin of the X, Y coordinate system of FIG. 2), is subjected to level conversion and then assigned a predetermined offset signal, so that the coordinate data is transformed into coordinates within that display area of the display section 3 which is allocated to the corresponding channel. At this point, a signal-quality-indicating signal on each channel is likewise subjected to level conversion and then assigned an offset, so that it is transformed into coordinates within the corresponding display area of each channel.

As a result, the distribution pattern of an equalized output signal and a signal quality signal (in the form of a straight line extending in the X-axis direction in FIG. 2) on the A channel are displayed on the first quadrant of the display section 3. Likewise, the distribution pattern of an equalized output signal and a signal quality signal for the B channel are displayed on the second quadrant of the display section 3. The distribution pattern of an equalized output signal and a signal quality signal for the C channel are displayed on the third quadrant of the display section 3. The distribution pattern of an equalized output signal and a signal quality signal for the secondary channel are displayed on the fourth quadrant of the display section 3.

Figure 3:
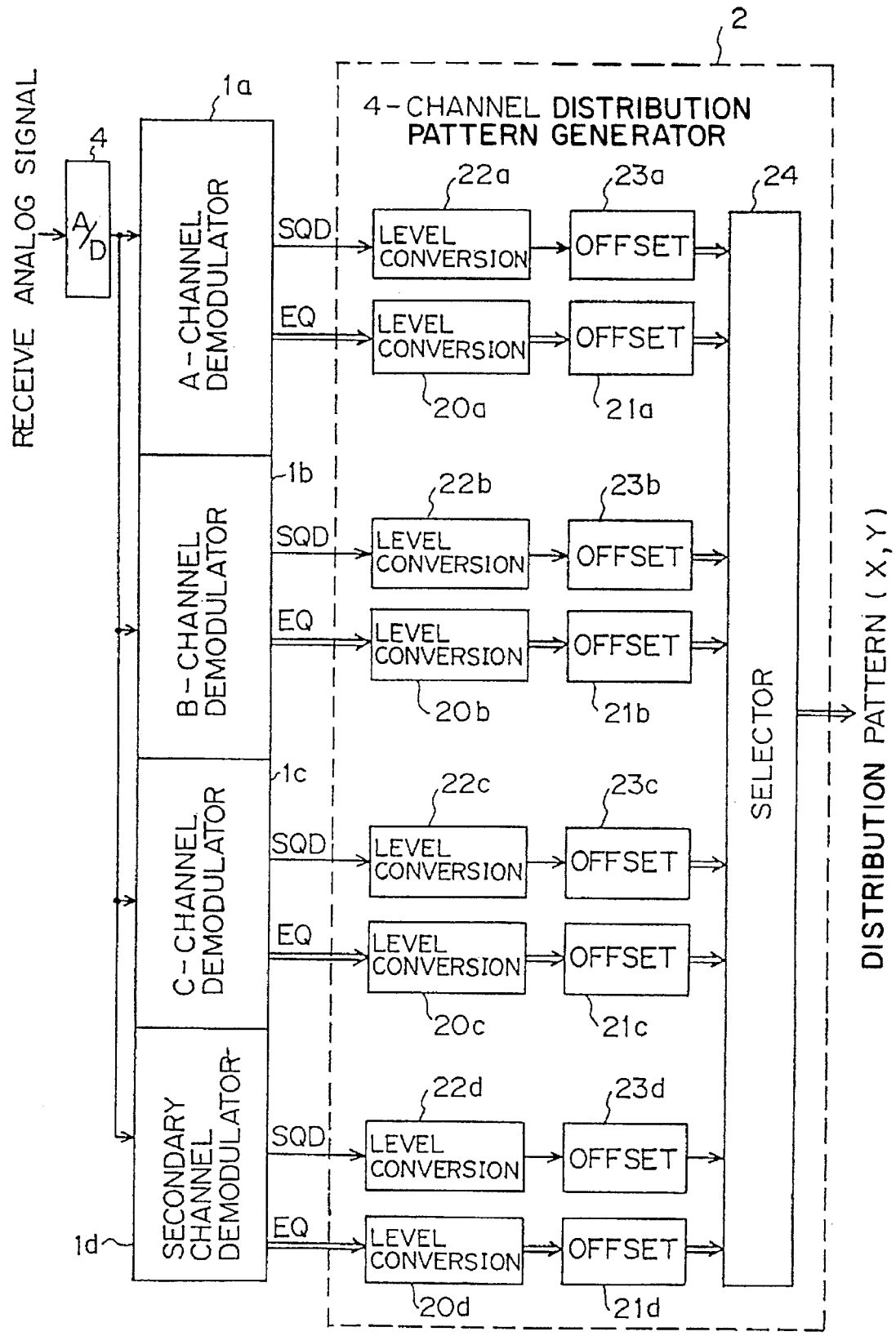
FIG. 3 is a block diagram of a modem embodying the preferred embodiment of the present invention.

FIG. 3 shows an arrangement of an FDM modem according to a preferred embodiment of the present invention. It is supposed that the band of a voice-grade analog line is divided into A, B and C channels and a secondary channel as in the case of FIG. 2.

An analog signal received by the FDM modem is converted by an analog-to-digital (A/D) converter 4 to a digital signal, which is, in turn, applied to the channel demodulators 1a to 1d. Each of the channel demodulators 1a to 1d compensates for the distortion of a receive signal caused by a transmission path to obtain an equalized output signal EQ and then outputs the signal EQ and signal quality data SQD indicating the signal quality of the corresponding channel to a four-channel distribution pattern generator 2.

The four-channel distribution pattern generator 2 comprises level converters 20a to 20d and 22a to 22d, offset adders 21a to 21d and 23a to 23d, and a selector 24. The level converters 20a to 20d convert signal levels of the equalized output signals EQ output from the channel demodulators 1a to 1d to sufficient signal levels to be displayed on the display area of the display 3 assigned to each channel. The level converters 22a to 22d likewise convert signal levels of the signal quality data SQD output from the demodulators 1a to 1d to sufficient signal levels to be displayed on the display 3. Each of the offset adders 21a to 21d and 23a to 23d adds a fixed offset to coordinate data of the corresponding level-converted signal so that it may be displayed on the corresponding display area. The selector 24 selects among the offset-added signals from the offset adders.

The A-channel level converter 20a is a circuit which amplifies (or attenuates) the level of the equalized output signal EQ output from the A-channel demodulator 1a so that the signal EQ can be displayed on the first quadrant (the first quadrant of a synchroscope screen shown in FIG. 4) which is the display area allocated to the A channel.

The offset adder 21a is a circuit which adds predetermined offset signals ($X_1$, $Y_1$) to the coordinate data of the equalized output signal EQ, which has been subjected to level conversion in the level converter 20a, so as to permit the signal EQ to be displayed on the first-quadrant display area allocated to the A-channel.

Likewise, the B-channel level converter 20b is a circuit which amplifies (or attenuates) the level of the equalized output signal EQ output from the B-channel demodulator 1b so that the signal EQ can be displayed on the second quadrant allocated to the B channel. The offset adder 21b is a circuit which adds predetermined offset signals ($-X_1$, $-Y_1$) to the coordinate data of the level-converted equalized output signal EQ from the level converter 20b so that the signal EQ can be displayed on the second quadrant display area allocated to the B channel.

The C-channel level converter 20c is a circuit which amplifies (or attenuates) the level of the equalized output signal EQ output from the C-channel demodulator 1c so that the signal EQ can be displayed on the third quadrant allocated to the C channel. The offset adder 21c is a circuit which adds predetermined offset signals ($-X_3$, $-Y_3$) to the coordinate data of the level-converted equalized output signal EQ from the level converter 20c so that the signal EQ can be displayed on the third quadrant display area allocated to the C channel.

The secondary-channel level converter 20d is a circuit which amplifies (or attenuates) the level of the equalized output signal EQ output from the secondary demodulator 1d so that the signal EQ can be displayed on the fourth quadrant allocated to the secondary channel. The offset adder 21d is a circuit which adds predetermined offset signals ($X_1$, $-Y_3$) to the coordinate data of the level-converted equalized output signal EQ from the level converter 20d so that the signal EQ can be displayed on the fourth quadrant display area allocated to the secondary channel.

The A-channel level converter 22a is a circuit which amplifies (or attenuates) the level of the signal quality data SQD output from the A-channel demodulator 1a so that the data SQD can be displayed on the first-quadrant display area allocated to the A channel. The offset adder 23a is a circuit which adds predetermined offset signals ($X_1$, $Y_2$) to the coordinate data of the level-converted signal quality data SQD from the level converter 22a so that the data SQD can be displayed on the first-quadrant display area allocated to the A channel.

Likewise, the B-channel level converter 22b is a circuit which amplifies (or attenuates) the level of the signal quality data SQD output from the B-channel demodulator 1b so that the data SQD can be displayed on the second-quadrant display area allocated to the B channel. The offset adder 23b is a circuit which adds predetermined offset signals ($-X_1$, $Y_2$) to the coordinate data of the level-converted signal quality data SQD from the level converter 22b so that the data SQD can be displayed on the second-quadrant display area allocated to the B channel.

The C-channel level converter 22c is a circuit which amplifies (or attenuates) the level of the signal quality data SQD output from the C-channel demodulator 1c so that the data SQD can be displayed on the third-quadrant display area allocated to the C channel. The offset adder 23c is a circuit which adds predetermined offset signals ($-X_1$, $Y_4$) to the coordinate data of the level-converted signal quality data SQD from the level converter 22c so that the data SQD can be displayed on the third-quadrant display area allocated to the C channel.

The secondary-channel level converter 22d is a circuit which amplifies (or attenuates) the level of the signal quality data SQD output from the secondary-channel demodulator 1d so that the data SQD can be displayed on the fourth-quadrant display area allocated to the secondary channel. The offset adder 23d is a circuit which adds predetermined offset signals ($X_1$, $-Y_4$) to the coordinate data of the level-converted signal quality data SQD from the level converter 22d so that the data SQD can be displayed on the fourth-quadrant display area allocated to the secondary channel.

Figure 4:
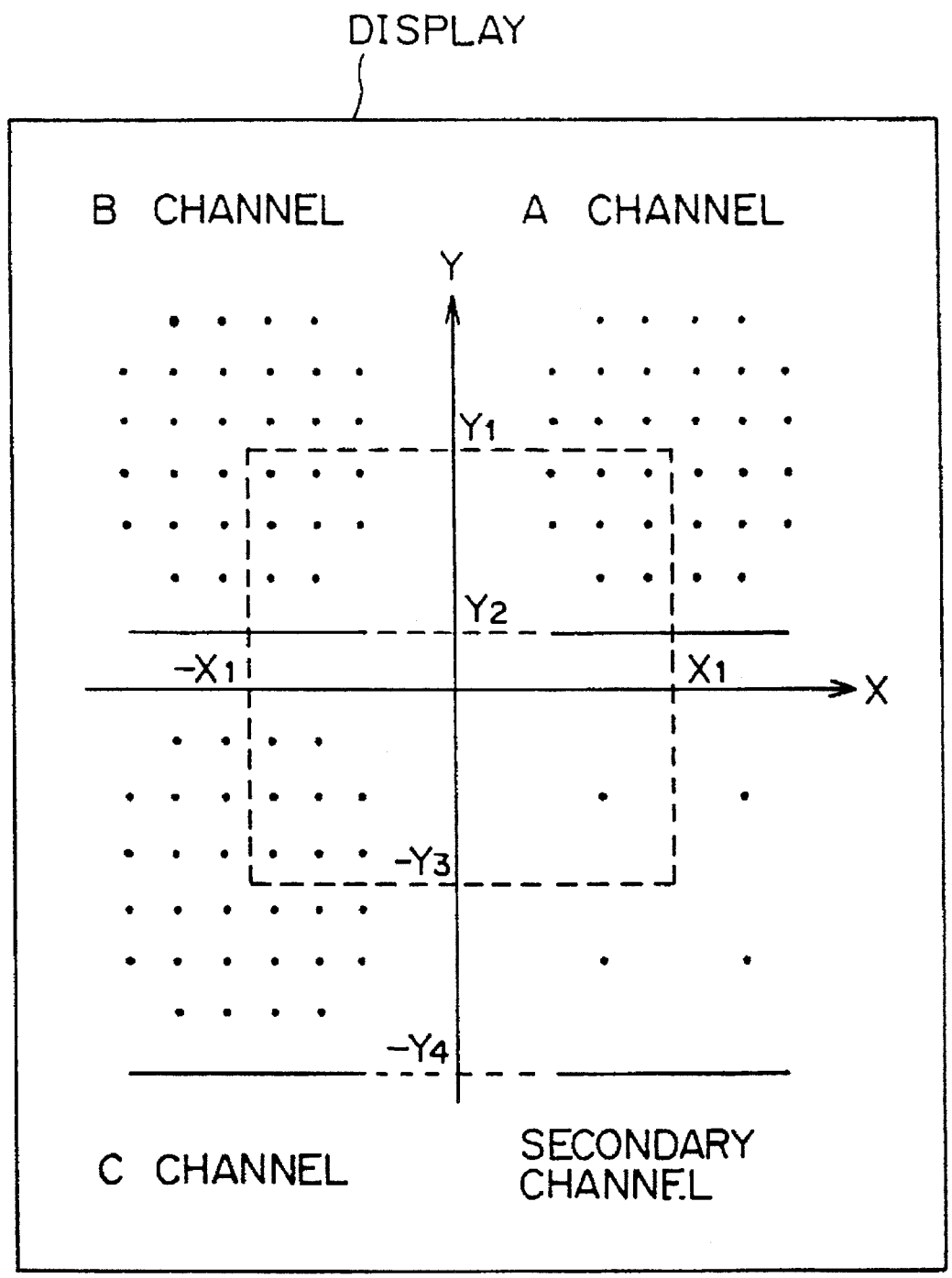
FIG. 4 is a diagram used to explain the display state of distribution patterns in the preferred embodiment.

The offset-added equalized output signals EQ and signal quality data EQ are selected in sequence by the selector 24 to be output to the synchroscope. As a result, as shown in FIG. 4, the distribution pattern of the A-channel equalized output signal EQ is displayed on the first quadrant of the display 3 and the A-channel signal quality data SQD is displayed in the form of a straight line below the distribution pattern. In this case, the length of the straight line of the signal quality data SQD indicates the quality of a received signal. The shorter the length of the straight line, the lower the signal quality.

Likewise, the distribution pattern of the B-channel equalized output signal EQ and the B-channel signal quality data SQD are displayed on the second quadrant, the distribution pattern of the C-channel equalized output signal EQ and the C-channel signal quality data SQD are displayed on the third quadrant, and the distribution pattern of the secondary-channel equalized output signal EQ and the secondary-channel signal quality data SQD are displayed on the fourth quadrant.

A specific arrangement of the channel demodulators 1a to 1d will be described hereinafter with reference to FIG. 5.

A demodulator 10 demodulates a digital passband signal from the A/D converter 4 to a baseband signal. A bandpass filter 11 extracts frequency components allocated to the corresponding channel.

An automatic gain control (AGC) circuit automatically changes its gain according to input signal levels so that its output is substantially constant in amplitude level. An automatic equalizer (AEQ) 13 is a circuit which compensates for phase distortion, group delay distortion and so on caused by a transmission path to remove distortion from an input signal.

A carrier automatic phase compensator (CAPC) 14 compensates the phase of an equalized output signal. A detector (DET) 15 detects a signal point closest to the phase-compensated signal. An output signal of the carrier automatic phase compensator 14 is output to the distribution pattern generator 2 as an equalized output signal EQ. Phase compensation information from the carrier automatic phase compensator 14 and error information from the detector 15 are fed back to the automatic equalizer 13, which carries out the process of signal equalization on the basis of these pieces of information.

The result of detection by the detector 15 is output to a signal quality detector (SQD) 16 and a decoder not shown which decodes coded data.

The signal quality detector 16 integrates a difference signal (error signal) between a before-detection signal (input signal) and an after-detection signal (output signal) of the detector 15. The result of integration is output as signal quality data SQD for the corresponding channel.

A timing extractor 17 extracts timing signals from the signal output from the bandpass filter 11. A carrier detector (CD) 18 detects a carrier frequency of the output signal of the bandpass filter 11.

Figure 5:
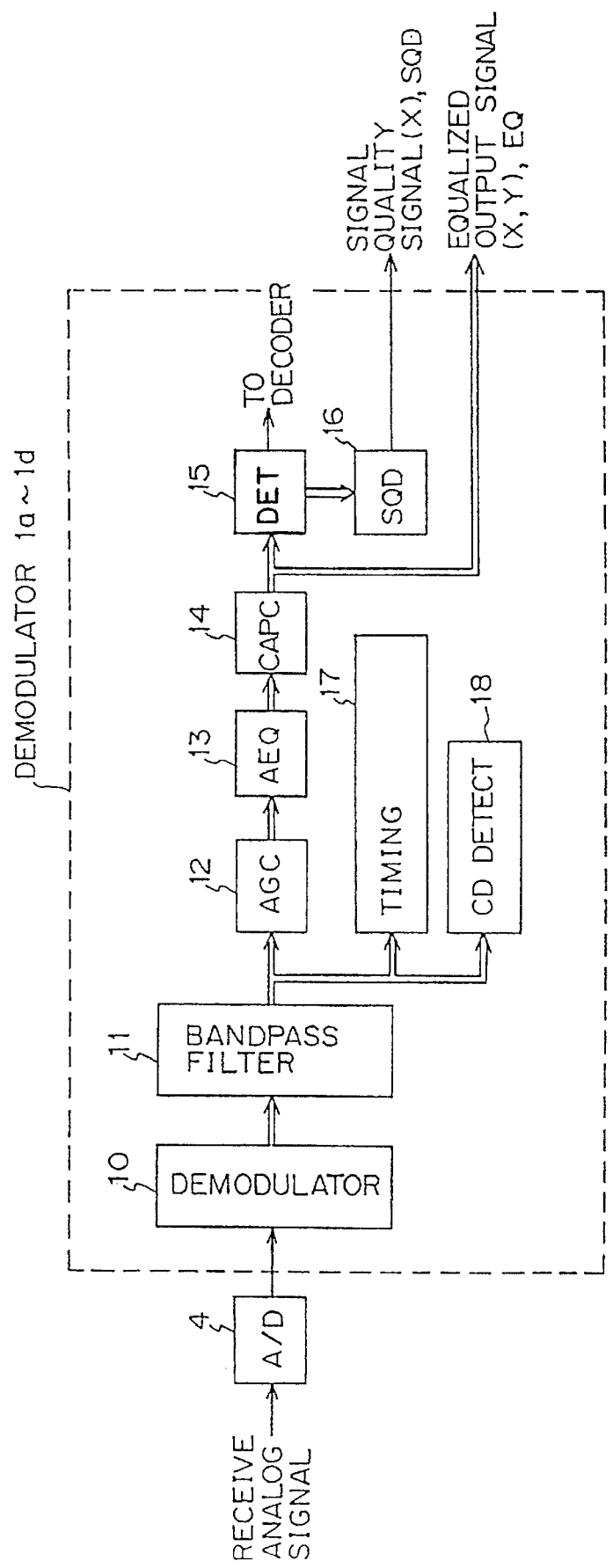
FIG. 5 is a block diagram of the circuit of the demodulator according to the preferred embodiment.

Basically, each of the channel demodulators 1a to 1d have the same arrangement as that shown in FIG. 5. They differ only in that the A, B and C-channel demodulators perform demodulation of 32-valued quadrature amplitude modulation (QAM), the secondary-channel demodulator performs demodulation of phase shift keying (PSK), and the bandpass filters 11 have different pass bands.

Figure 6:
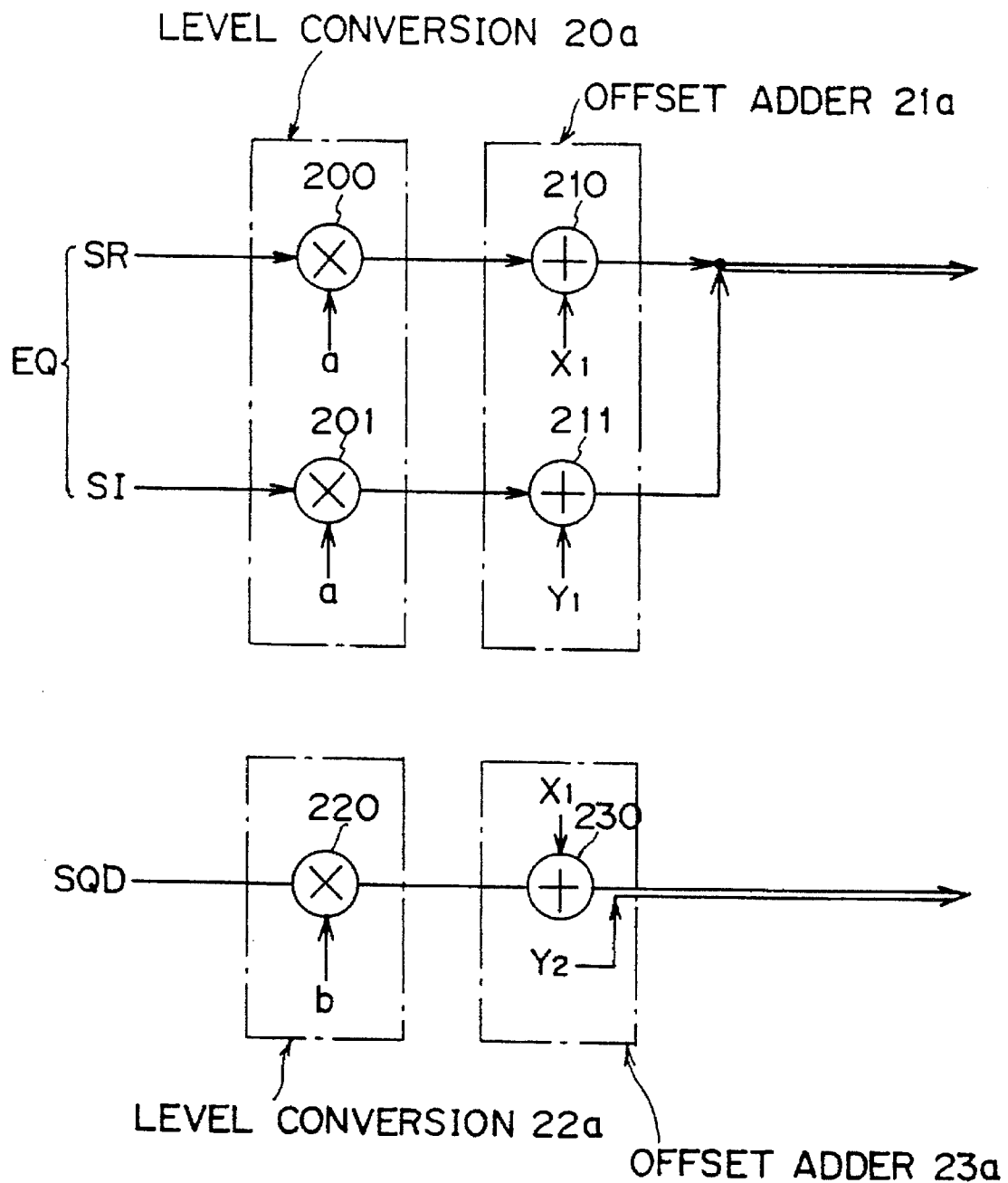
FIG. 6 is a block diagram of the circuit of the distribution pattern generator in accordance with the preferred embodiment.

Next, a specific arrangement of the distribution pattern generator 2 will be described with reference to FIG. 6, which shows the level converters 20a and 22a and the offset adders 21a and 23a for the A channel. The other channels have the same arrangement.

The A-channel distribution pattern generator 2 handles an equalized output signal EQ output from the A-channel demodulator 1a as a complex signal, and converts signal quality data SQD consisting of a real part to complex data.

Specifically, the level converter 20a comprises a multiplier 200 for multiplying the real part SR of the equalized output signal EQ by a constant value a and a multiplier 201 for multiplying the imaginary part SI by the constant value a. The purpose of the level conversion is to permit the equalized output signal EQ to have a suitable signal level for display on the first quadrant of the display 3 which is the display area allocated to the A channel.

The offset adder 21a comprises an adder 210 for adding a constant offset value $X_1$ to the real part SR of the level-converted complex signal and an adder 211 for adding a constant offset value $Y_1$ to the imaginary part SI. The purpose of the offset addition is to perform coordinate transformation on a two-dimensional plane so that the distribution pattern of the A-channel equalized output signal EQ can be displayed on the first quadrant of the display 3.

In this embodiment, the signal quality data SQD is a signal consisting of real part which indicates signal quality by the length of a straight line on a two-dimensional plane. A multiplier 220 in the level converter 22a multiplies the real part by a constant value b and an adder 230 in the offset adder 23a adds a constant offset value $X_1$ to the real part. An offset value $Y_2$ is added as an imaginary part, thereby achieving conversion to a complex signal.

Hereinafter, the operation of the FDM modem arranged as described above will be described with reference to FIGS. 3 to 6.

The real part SR and the imaginary part SI of an equalized output signal (X, Y) (a complex signal) from the carrier automatic phase compensator 14 of FIG. 5 are multiplied by the constant value a by the multipliers 200 and 201 in the level converter 20a, respectively. Consequently, the output signal is converted to a signal having a suitable magnitude for display on the first quadrant of the display 3, allocated to the A channel. In this case, in order to display the A-channel equalized output signal (X, Y) on the first quadrant, the level converter 20a multiplies it by such a value a as to reduce its signal level.

In order to display the A-channel equalized output signal on the first quadrant, the adders 210 and 211 of the offset adder 21a add the offset values $(X_1, Y_1)$ to the real and imaginary parts of the equalized output signal (X, Y) which has been subjected to level conversion in the level converter 20a.

Likewise, the signal quality data SQD (in this case it consists of a real part) output from the signal quality detector 16 in the A-channel demodulator 1a is multiplied by the constant value b by the multiplier 220 in the level converter 22a, so that the data SQD is subjected to level conversion. Further, the offset value $X_1$ is added to the signal quality data SQD by the adder 230 in the offset adder 23a and the constant value $Y_2$ is added as an imaginary part, so that the data SQD is converted to a complex signal.

When the outputs of the A-channel offset adders 21a and 23a are selected by the selector 24, the eye pattern of the A-channel equalized output signal is displayed with center at the coordinates $X_1$ and $Y_1$ in the first quadrant as shown in FIG. 4. At the same time, the signal quality data SQD indicating the receive condition of the A channel is displayed below the distribution pattern as a straight line extending in the X-axis direction. In this case, the length of the straight line gives the measure of the receive condition. When the straight line is short, the signal quality is poor.

The same is the case with the B channel. That is, the real part SR and the imaginary part SI of an equalized output signal (X, Y) from the carrier automatic phase compensator 14 of the B-channel demodulator 1b are multiplied by the constant value a by the multipliers 200 and 201 in the level converter 20b, respectively. Consequently, the output signal is converted to a signal having a suitable magnitude for display on the second quadrant of the display 3. In order to display the B-channel equalized output signal on the second quadrant, the adders 210 and 211 of the offset adder 21b add the offset values $(-X_1, Y_1)$ to the real and imaginary parts of the equalized output signal.

Likewise, the signal quality data SQD output from the signal quality detector 15 in the B-channel demodulator 1b is multiplied by the constant value b by the multiplier 220 in the level converter 22b, so that the data SQD is subjected to level conversion. Further, the offset value $-X_1$ is added to the signal quality data SQD by the adder 230 in the offset adder 23b and the constant value $Y_2$ is added as the imaginary part, so that the data SQD is converted to a complex signal.

When the outputs of the B-channel offset adders 21b and 23b are selected by the selector 24, the distribution pattern of the B-channel equalized output signal is displayed with center at the coordinates $-X_1$ and $Y_1$ in the second quadrant as shown in FIG. 4. At the same time, the signal quality data SQD indicating the receive condition of the B channel is displayed below the distribution pattern as a straight line extending in the X-axis direction.

In the case of the C channel as well, the real part SR and the imaginary part SI of an equalized output signal (X, Y) from the carrier automatic phase compensator 14 of the C-channel demodulator 1c are multiplied by the constant value a by the multipliers 200 and 201 in the level converter 20c, respectively. Consequently, the output signal is converted to a signal having a suitable magnitude for display on the third quadrant of the display 3, allocated to the C channel. In order to display the C-channel equalized output signal on the third quadrant, the offset values $(-X_1, -Y_3)$ are added to the real and imaginary parts of the equalized output signal in the adders 210 and 211 of the offset adder 21c.

Likewise, the signal quality data SQD output from the signal quality detector 15 in the C-channel demodulator 1c is multiplied by the constant value b by the multiplier 220 in the level converter 22c, so that the data SQD is subjected to level conversion. Further, the offset value $-X_1$ is added to the signal quality data SQD by the adder 230 in the offset adder 23c and the constant value $-Y_4$ is added as imaginary part, so that the data SQD is converted to a complex signal.

When the outputs of the C-channel offset adders 21c and 23c are selected by the selector 24, the eye pattern of the C-channel equalized output signal is displayed with center at the coordinates $-X_1$ and $-Y_3$ in the third quadrant as shown in FIG. 4. At the same time, the signal quality data SQD indicating the receive condition of the C channel is displayed below the distribution pattern as a straight line extending in the X-axis direction.

Further, the real part SR and the imaginary part SI of an equalized output signal (X, Y) from the carrier automatic phase compensator 14 of the secondary-channel demodulator 1d are multiplied by the constant value by the multipliers 200 and 201 in the level converter 20d, respectively. Consequently, the output signal is converted to a signal having a suitable magnitude for display on the third quadrant of the display 3, allocated to the C channel. In order to display the secondary-channel equalized output signal on the fourth quadrant, the offset values $(X_1, -Y_3)$ are added to the real and imaginary parts of the equalized output signal in the adders 210 and 211 of the offset adder 21d.

Likewise, the signal quality data SQD output from the signal quality detector 15 in the secondary-channel demodulator 1d is multiplied by the constant value b by the multiplier 220 in the level converter 22d, so that the data SQD is subjected to level conversion. Further, the offset value $X_1$ is added to the level-converted signal quality data SQD by the adder 230 in the offset adder 23d, and the constant value $-Y_4$ is added as imaginary part, so that the data SQD is converted to a complex signal.

When the outputs of the secondary-channel offset adders 21d and 23d are selected by the selector 24, the distribution pattern of the secondary-channel equalized output signal is displayed with center at the coordinates $X_1$ and $-Y_3$ in the fourth quadrant as shown in FIG. 4. At the same time, the signal quality data SQD indicating the receive condition of the secondary channel is displayed below the distribution pattern as a straight line extending in the X-axis direction.

By repeating the above operation, as shown in FIG. 4, the distribution patterns of the A-channel, B-channel, C-channel and secondary-channel equalized output signals are simultaneously displayed on the first, second, third and fourth quadrants of the display screen 3 of the synchroscope, respectively, and the signals indicating receive conditions of the A, B, C and secondary channels are each displayed below respective corresponding distribution patterns.

The preferred embodiment thus permits the eye patterns of multiple channels to be monitored simultaneously without switching from a channel to another as in the prior art. In addition, each channel-receive-condition indicating signal is displayed simultaneously with a corresponding distribution pattern, thus permitting line conditions to be understood more properly.

Although the above-described preferred embodiment was described as being adapted to four channels, the number of channels is not limited to four. Within a displayable range any number of channels can be displayed simultaneously. Further, the display method is not restricted to the above method which displays each distribution pattern on a respective one of the first, second, third and fourth quadrants of the display 3. For example, use may be made of a display method which divides the entire display area of the display 3 vertically or horizontally into several display areas and displays the distribution pattern of each channel on a respective one of the resultant display areas.

Although, in the above-described preferred embodiment, equalized output signals of a modem are displayed on the display screen 3 of a synchroscope, the modem itself may be provided with a display for displaying distribution patterns.

The distribution pattern display device may be adapted not only to a modem as in the embodiment but also to equipment such as a repeater with no modulation function. Although the preferred embodiment of the present invention has been disclosed and described, it is apparent that other embodiments and modifications are possible.

What is claimed is:

1. A distribution pattern display device for receiving and equalizing signals transmitted on a frequency-division multiplex basis and displaying the distribution patterns of received signals subjected to equalization, comprising:

equalizing means for compensating for distortion which a signal on each frequency channel undergoes on a transmission path;

level conversion means for converting the signal level of an equalized output signal on each channel from said equalizing means by multiplying the equalized output signal on each channel by a predetermined value;

coordinate transformation means for transforming the coordinates of a level-converted equalized output signal on each channel output from said level conversion means so as to display the level-converted equalized output signal in a display having respective display areas corresponding to each frequency channel; and control means for permitting each of coordinate-transformed equalized output signals on the frequency channels output from said coordinate transformation means to be displayed simultaneously on a corresponding one of display areas of said display.

2. The device according to claim 1, wherein said equalizing means includes an automatic equalizer for compensating for distortion that a signal on each frequency channel undergoes on the transmission path, a phase compensator for compensating the phase of an equalized output signal from said automatic equalizer, and a detector for detecting a signal point corresponding to an output signal of said phase compensator, said level conversion means converts the signal level of an equalized output signal output from said phase compensator, and said coordinate transformation means includes an offset adder for adding predetermined offset signals to a level-converted equalized output signal from said level conversion means so that it can be displayed on the corresponding display area of said display.

3. The device according to claim 1, wherein said level conversion means includes a multiplier for multiplying an equalized output signal on each frequency channel by a predetermined value, and said coordinate transformation means includes an adder for adding predetermined offset signals to a level-converted equalized output signal on each channel so that it can be displayed on a display area of said display which is allocated to the corresponding channel.

4. A distribution pattern display device for receiving and equalizing signals transmitted on a frequency-division multiplex basis and displaying the distribution patterns of received signals subjected to equalization, comprising:

equalizing means for compensating for distortion which a signal on each frequency channel undergoes on a transmission path to produce an equalized output signal and outputting a signal quality signal indicating the receive condition of each channel;

level conversion means for converting the signal levels of said equalized output signal and said signal quality signal on each channel from said equalizing means to signal levels which permit said equalized output signal and said signal quality signal to be displayed on a display area allocated to the corresponding channel by multiplying said equalized output signal and said signal quality signal by a predetermined value;

coordinate transformation means for transforming the coordinates of a level-converted equalized output signal and a level-converted signal quality signal from said level conversion means so that they can be displayed on said display area of a display which is allocated to that channel; and control means for permitting coordinate-transformed equalized output signals and coordinate-transformed signal quality signals on the frequency channels output from said coordinate transformation means to be displayed simultaneously on corresponding respective display areas of said display.

5. The device according to claim 4, wherein said equalizing means includes an automatic equalizer for compensating for distortion that a signal on each frequency channel undergoes on the transmission path and outputting a signal quality signal indicating the receive condition of each channel, a phase compensator for compensating the phase of an equalized output signal from said automatic equalizer, and a detector for detecting a signal point corresponding to an output signal of said phase compensator, said level conversion means converts the signal levels of said equalized output signal and said signal quality signal on each channel output from said phase compensator, and said coordinate transformation means includes offset adders for adding predetermined offset signals to a level-converted equalized output signal and a level-converted signal quality signal on each channel from said level conversion means so that they can be displayed on a display area of said display which is allocated to that channel.

6. The device according to claim 4, wherein said level conversion means includes first and second multipliers for multiplying Said equalized output signal and said signal quality signal from said equalizing means by predetermined values, respectively, and said coordinate transformation means includes first and second adders for adding predetermined offset signals to a level-converted equalized output signal and a level-converted signal quality signal so that they can be displayed on a display area of said display which is allocated to the corresponding channel.

7. A distribution pattern display method of displaying distribution patterns of equalized signals obtained by receiving and equalizing signals transmitted on a frequency-division multiplex basis, comprising the steps of:

compensating for distortion of a received signal on each of frequency channels caused by a transmission path;

converting the signal level of an equalized output signal on each channel by multiplying the equalized output signal on each channel by a predetermined value;

transforming the coordinates of a level-converted equalized output signal on each channel so that it can be displayed on a display area of a display which is allocated to that channel; and displaying equalized output signals on the frequency channels simultaneously on corresponding respective display areas of said display.

8. A distribution pattern display method of displaying distribution patterns of equalized signals obtained by receiving and equalizing signals transmitted on a frequency-division multiplex basis, comprising the steps of:

compensating for distortion of a received signal on each of frequency channels caused by a transmission path to produce an equalized output signal;

outputting a signal quality signal indicating the receive condition of each channel;

converting the signal level of said equalized output signal and said signal quality signal by multiplying said equalized output signal and said signal quality signal by a predetermined value;

transforming the coordinates of a level-converted equalized output signal and a level-converted signal quality signal on each channel so that they can be displayed on a corresponding display area of a display which is allocated to that channel; and displaying equalized output signals and signal quality signals on the frequency channels simultaneously on corresponding respective display areas of said display.

9. A device for simultaneously displaying distribution patterns of signals transmitted over a plurality of frequency channels on a frequency-division multiplex basis, comprising:

equalizing means for compensating for distortion of respective signals transmitted over the frequency channels and outputting equalized signals corresponding to the respective frequency channels;

level conversion means for converting a signal level of the respective equalized output signals from the equalizing means and outputting level-converted signals corresponding to the respective frequency channels by multiplying the respective equalized output signals on respective frequency channels by a predetermined value;

coordinate transformation means for transforming coordinates of respective equalized output signals level-converted by said level conversion means to display the respective level-converted equalized output signals in a display area corresponding to the respective frequency channels;

a display device to display the respective coordinate-transformed output signals on corresponding display areas allocated to the respective frequency channels; and control means for controlling display of the respective coordinate-transformed output signals on the corresponding areas of the display allocated to the respective frequency channels.

10. A distribution pattern display device as recited in claim 9, wherein the equalizing means comprises an automatic equalizer to compensate for distortion of respective signals on the frequency channels to equalize the signals, a phase compensator to compensate the phase of the respective equalized signals from the automatic equalizer, and a detector to detect a signal point corresponding to respective signals from the phase compensator, wherein said level conversion means converts signal levels of the respective equalized signals from the phase compensator, and the coordinate transformation means includes an offset adder for adding predetermined offset signals to the respective level-converted signals from the level conversion means.

11. A distribution pattern display device as recited in claim 9, wherein the level conversion means includes a multiplier for multiplying the respective equalized output signals by a predetermined value, and the coordinate transformation means includes an adder for adding predetermined offset signals to the respective level-converted signals.

12. A distribution pattern display device for displaying distribution patterns of a plurality of signals received from a plurality of frequency channels on a frequency-division multiplex basis, comprising:

equalizing means for compensating for distortion of respective signals on said plurality of frequency channels to produce respective equalized output signals and corresponding signal quality signals indicating a receive condition of the respective frequency channels;

level conversion means for converting the respective signal levels of the equalized output signals and the corresponding signal quality signals on respective frequency channels to signal levels which permit the respective equalized output signals and the corresponding signal quality signals to be displayed by multiplying the respective equalized output signals and the corresponding signal quality signals by a predetermined value;

coordinate transformation means for transforming the coordinates of the respective level-converted equalized output signals and the corresponding level-converted signal quality signals from the level conversion means;

a display to display the respective coordinate-transformed signals and the corresponding coordinate-transformed signal quality signals on areas allocated to the respective frequency channels; and control means for controlling display of the respective coordinate-transformed signals and the corresponding coordinate-transformed signal quality signals from said coordinate transformation means to simultaneously display the coordinate-transformed signals and the corresponding coordinate-transformed signal quality signals on areas of the display allocated to the respective frequency channels.

13. The device according to claim 12, wherein the equalizing means includes an automatic equalizer to compensate for distortion that the signals on respective frequency channels undergo and to output equalized signals and the corresponding signal quality signals indicating the receive condition of each channel, a phase compensator to compensate the phase of the respective equalized output signals from the automatic equalizer, and a detector to detect respective signal points corresponding to output signals from the phase compensator, the level conversion means converts the signal levels of the respective equalized output signals and the corresponding signal quality signals from the phase compensator, and the coordinate transformation means includes offset adders to add predetermined offset signals to the respective level-converted equalized output signals and the corresponding level-converted signal quality signals.

14. A distribution pattern display device according to claim 12, wherein the level conversion means includes first and second multipliers to multiply the respective equalized output signals and the corresponding signal quality signals from the equalizing means by predetermined values, and the coordinate transformation means includes first and second adders to add predetermined offset signals to the respective level-converted equalized output signals and the corresponding level-converted signal quality signals.

15. A distribution pattern display method for displaying distribution patterns of signals received on a plurality of frequency channels on a frequency-division multiplex basis, comprising the steps of:

compensating for distortion of the signals received on respective frequency channels to produce respective equalized output signals corresponding to the respective frequency channels;

converting respective signal levels of the equalized output signals corresponding to the respective frequency channels by multiplying the equalized output signals by a predetermined value;

transforming coordinates of the respective level-converted signals; and simultaneously displaying the coordinate-transformed signals corresponding to the respective frequency channels on corresponding respective areas of a display.

16. A distribution pattern display method for displaying distribution patterns of signals received from a plurality of frequency channels on a frequency-division multiplex basis, comprising the steps of:

compensating for distortion of signals received on respective frequency channels to produce respective equalized output signals;

outputting respective signal quality signals indicating a receive condition of the respective frequency channels;

converting signal levels of the respective equalized output signals and the respective signal quality signals by multiplying respective equalized output signals and respective signal quality signals by a predetermined value;

transforming coordinates of the respective level-converted equalized output signals and the respective level-converted signal quality signals; and simultaneously displaying the respective coordinate-transformed equalized output signals and the respective coordinate-transformed signal quality signals on corresponding respective areas of a display.

17. A device for simultaneously displaying distribution patterns of signals transmitted over a plurality of frequency channels on a frequency-division multiplex basis, comprising:

equalizing means for compensating for distortion of respective signals transmitted over the frequency channels and outputting equalized signals corresponding to the respective frequency channels;

level conversion means for converting a signal level of the respective equalized output signals from the equalizing means and outputting level-converted signals responding to the respective frequency channels;

coordinate transformation means for transforming a coordinate data of the level-converted output signals by adding predetermined offset signals to respective level-converted output signals into a coordinate data centering on predetermined coordinates in each quadrant of two dimensional coordinates and outputting coordinate-transformed signals;

a display device to display the respective coordinate-transformed output signals on the corresponding display areas allocated to the respective frequency channels; and control means for controlling display of the respective coordinate-transformed output signals on the corresponding areas of the display allocated to the respective frequency channels.

18. A distribution pattern display device as recited in claim 17, wherein the level conversion means includes a multiplier for multiplying the respective equalized output signals with a predetermined value.

19. A device for simultaneously displaying distribution patterns of signals transmitted over a plurality of frequency channels on a frequency-division multiplex basis, comprising:

equalizing means for compensating for distortion of respective signals transmitted over the frequency channels and outputting equalized signals corresponding to the respective frequency channels;

level conversion means for converting a signal level by multiplying the equalized output signals by predetermined offset value and outputting level-converted signals responding to the respective frequency channel;

coordinate transformation means for transforming a coordinate data of the level-converted output signals by adding predetermined offset signals to respective level-converted output signals into a coordinate data centering on predetermined coordinates in each quadrant of two dimensional coordinates and outputting coordinate-transformed signals;

a display device to display the respective coordinate-transformed output signals on corresponding display areas allocated to the respective frequency channels; and control means for controlling display of the respective coordinate-transformed output signals on the corresponding areas of the display allocated to the respective frequency channels.

* * * * *